Nov. 4, 1952 H. N. HANSEN ET AL 2,617,036

FREQUENCY DIVIDER

Filed April 30, 1948

INVENTORS.
HENDRIK NICOLAAS HANSEN.
JOHANNES ANTON GREEFKES.
BY [signature]
AGENT Patented Nov. 4, 1952

2,617,036

UNITED STATES PATENT OFFICE 2,617,036

FREQUENCY DIVIDER

Hendrik Nicolaas Hansen and Johannes A. Greefkes, Eindhoven, Netherlands, assignors to Hartford National Bank and Trust Company, Hartford, Conn., as trustee Application April 30, 1948, Serial No. 24,224
In the Netherlands May 19, 1947

5 Claims. (Cl. 250—36)

Figure 1:
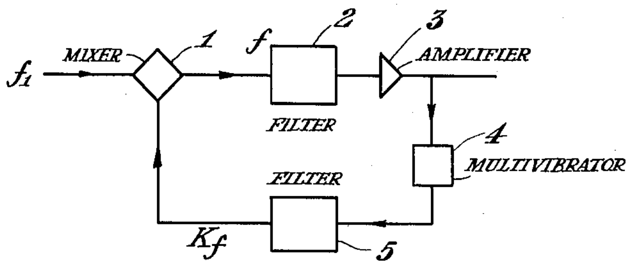

This invention relates to a frequency-divider circuit-arrangement, more particularly for producing the carrier-waves in a multiplex carrier-wave telephone system, in which an alternating voltage of lower frequency is obtained by modulating, in a mixer, an alternating voltage of higher frequency with an alternating voltage of intermediate frequency, the latter being taken from a generator which produces harmonics of the alternating voltage of lower frequency supplied to this generator.

For the sake of clarity such a circuit-arrangement, which is usually called a regenerative frequency-divider, will be explained with reference to the schematic Figure 1.

The alternating voltage of the frequency $f_1$ to be divided is fed to a mixer 1. The output circuit of this mixer comprises a filter 2 passing the voltage of the desired lower frequency $f$, which voltage is subsequently amplified by an amplifier 3. The output voltage of a frequency $f$ is supplied to a multivibrator 4 producing a number of harmonics. One of these harmonics $kf$ ($k$ is a natural number) is selected by the filter 5 and fed to the mixer 1.

The relation should be satisfied $$f_1-kf=f \text{ or } \frac{f_1}{f}=1+k$$

so that the phase of the voltage also is in stable equilibrium.

Such a circuit-arrangement is, for instance, used in carrier-wave telephone systems, wherein the frequency $f_1$ of the master oscillator is, for instance, 60 kc./sec. and the frequencies of the carrier-waves of the different conversation channels are derived from harmonics of 4 kc./sec. Consequently, the frequency-divider should reduce the frequency from 60 kc./sec. to 4 kc./sec., whereupon the diverse carrier-wave frequencies can be obtained from the multivibrator 4.

With this type of circuit-arrangements difficulties are experienced in switching on since, due to switching on phenomena in the different component parts, the desired cycle cannot easily be started. These difficulties increase on using higher division factors in a division stage.

The amplitude of the voltage having a frequency $f$ should exceed a given minimum value, since otherwise the multivibrator supplies little if any harmonics.

In the literature it is usually assumed that the abrupt application of anode voltages for the various component parts causes a sufficient voltage pulse for initiating the operation of the circuit.

However, this method is not reliable and, moreover, any failing of the supply voltage of the cathodes of the different discharge tubes and the subsequent return of this voltage cause that the anode current in these tubes increases too slowly to start the circuit.

The circuit-arrangement according to the invention meets these disadvantages and exhibits the feature that the frequency divider arrangement comprises another circuit which is adapted both for selective amplification and for producing the alternating voltage of lower frequency or the alternating voltage of intermediate frequency.

Figure 2:
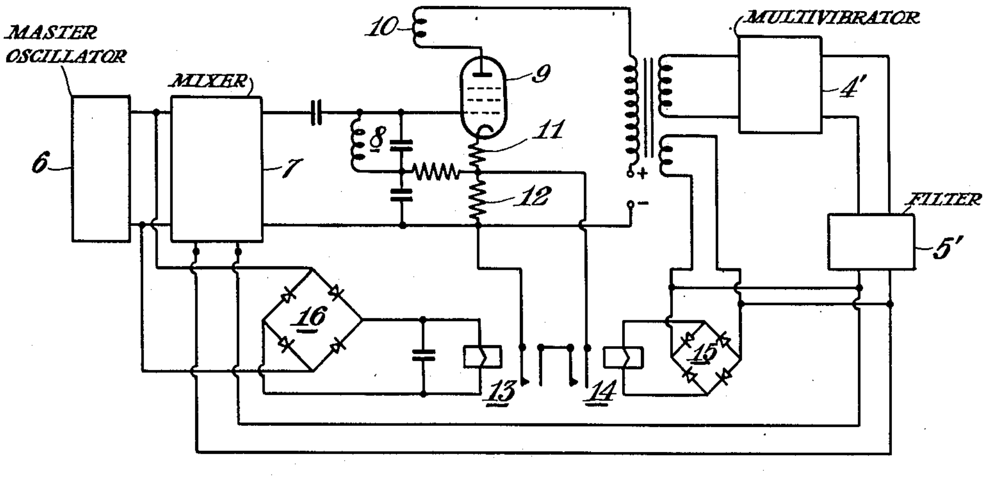
Figure 3:
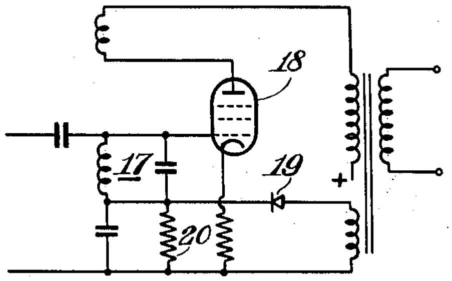

In order that the invention may be more fully understood and readily carried into effect, it will now be described more fully with reference to Figs. 2 and 3, given by way of example, which represent embodiments thereof.

The output voltage of frequency $f_1$ of the master oscillator 6 is supplied to the mixer 7, and the output voltage of this modulator is fed to the circuit 8 which is tuned to a lower frequency $f$. This circuit is included in the control-grid voltage of the discharge tube 9, of which the output circuit is positively coupled back, through the inductance 10, with the control-grid circuit. The cathode lead of this tube comprises the resistances 11 and 12. Due to the presence of the resistance 11 negative backcoupling occurs, but this is chosen to be so low as to permit the circuit to oscillate. If the resistance 12 is not short-circuited through the contacts of the relays 13 and 14, the negative back-coupling is increased to such a degree that the circuit does not oscillate but operates as a selective amplifier.

From the output circuit of the discharge tube a voltage is taken which is supplied to the generator for producing harmonics 4′, of which the output voltage is fed, through the filter 5′, to the mixer 7. At the same time part of the output voltage is supplied to the rectifying circuit 15. In this respect it is to be noted that the voltage supplied to the rectifying circuit 15 need not be taken, through a transformer, from the output circuit of the tube 9, since this may also be effected after the filter 5′ as indicated in dotted lines. The relay 14 is controlled by means of the direct voltage thus obtained and is adjusted in such manner that its contacts are not opened before a given amplitude of the output voltage of the discharge tube 9 is attained.

If only the contacts of the relay 14 are connected in parallel with the resistance 12 an amplifying effect of the circuit occurs upon opening these contacts.

In order to prevent forth and back connection of this relay, which would occur in the absence of the voltage of a frequency $f_1$ of the master oscillator 6, a rectifying circuit 16 is furthermore connected in parallel with the output of this master oscillator. This rectifying circuit controls the relay 13, the contacts of which are connected in series with those of the relay 14. This is effected in such manner that on dropping out of the master oscillator 6 i. e. in the absence of the voltage of a frequency $f_1$, this relay opens the short circuiting circuit of the resistance 12, so that the arrangement operates as a selective amplifier.

It is to be noted that the selectivity of the amplifying effect is materially higher than may be expected solely owing to the presence of the circuit 8, which results from the available positive backcoupling between the coil 10 and the coil of the circuit 8.

Furthermore it may be pointed out that the oscillator-effect is removed only upon attaining a definite output amplitude, owing to which the oscillator is consequently synchronised by the signal appearing at the input circuit. In this manner, consequently, the harmonic relation is also ensured between the frequencies $f_1$ and $f$.

It will be appreciated that the further arrangement for amplifying or producing a voltage of a definite frequency need not be interposed at the elements 2 and 3 in the circuit-arrangement shown in Fig. 1, as in the aforesaid executional example, but that this arrangement may also be interposed at the filter 5 shown in Fig. 1, in which event this circuit should naturally be adapted for producing and selectively amplifying an alternating voltage of intermediate frequency.

In the circuit-arrangement shown in Fig. 3 the signal from the modulator is likewise supplied to the tuned circuit 17 included in the control-grid circuit of the tube 18. In this case also a positive backcoupling is available between the anode- and control-grid circuit.

In this circuit arrangement part of the output voltage is rectified by means of the rectifier 19 with the result that a negative control-grid voltage is set up across the resistance 20, its value depending upon the amplitude of the alternating output voltage. With an increase in output amplitude a value of the negative bias is attained at which the oscillating effect of the circuit is suppressed and an amplifying effect is produced.

What we claim is:

1. Apparatus for deriving from a source of high-frequency oscillations a relatively low-frequency wave whose frequency is equal to the difference between the frequency of said oscillations and a predetermined harmonic of said wave, said apparatus comprising a tuned amplifying system including a resonant input circuit tuned to the frequency of said wave, means to effect regeneration in said system to sustain auxiliary oscillations therein having the frequency of said wave and control means selectively to suppress and to release said regeneration in said system, means coupled to the output of said amplifier to derive therefrom a predetermined harmonic of said wave, means to mix oscillations from said source with said harmonic to produce a beat voltage whose frequency is equal to the difference therebetween, means to apply said beat voltage to the input circuit of said system, and means responsive to the value of said beat voltage relative to said auxiliary oscillations and coupled to said selective control means to effect suppression of said regeneration when said beat voltage is in synchronism with said auxiliary oscillations and when out of synchronism to effect release of said regeneration.

2. Apparatus for deriving from a source of high-frequency oscillations a relatively low-frequency wave whose frequency is equal to the difference between the frequency of said oscillations and a predetermined harmonic of said wave, said apparatus comprising a tuned amplifying system including an electron discharge tube having a cathode, a grid and an anode, a resonant input circuit coupled to said grid and tuned to the frequency of said wave, an output circuit coupled to said anode, means to effect regenerative feedback between said output circuit and said input circuit to sustain auxiliary oscillations in said system having the frequency of said wave, a degenerative impedance connected to said cathode, and a normally closed relay-operated switch connected across said impedance, said impedance having a value at which said auxiliary oscillations are suppressed when said switch is open, means coupled to the output circuit of said amplifier to derive therefrom a predetermined harmonic of said wave, a mixer coupled to said source and to said harmonic deriving means to mix said oscillations with said harmonic to produce a beat voltage whose frequency is equal to the difference therebetween, means to apply said beat voltage to the input circuit of said system, and means coupled to said output circuit and responsive to a predetermined value of the amplitude of auxiliary oscillations produced therein to actuate said relay to open said switch.

3. An arrangement, as set forth in claim 2, wherein said harmonic deriving means is constituted by a multivibrator coupled to the output circuit of said amplifying system and synchronized by the wave therein to produce periodic pulses and a filter coupled to the output of said multivibrator to select a predetermined harmonic component therefrom.

4. Apparatus for deriving from a source of high-frequency oscillations a relatively low-frequency wave whose frequency is equal to the difference between the frequency of said oscillations and a predetermined harmonic of said wave, said apparatus comprising a tuned amplifying system including an electron discharge tube having a cathode, a grid and an anode, a resonant input circuit coupled to said grid and tuned to the frequency of said wave, an output circuit coupled to said anode, said output circuit being regeneratively coupled to said input circuit to sustain auxiliary oscillations in said system having the frequency of said wave, a degenerative impedance connected to said cathode having a value suppressing said auxiliary oscillations, a first normally closed relay-operated switch connected across said impedance and a second normally open relay-operated switch connected in series with said first switch, means coupled to the output circuit of said amplifier to derive therefrom a predetermined harmonic of said wave, a mixer coupled to said source and to said harmonic deriving means to mix said oscillations with said harmonic to produce a beat voltage whose frequency is equal to the difference therebetween, means to apply said beat voltage from said modulator to the input circuit of said system, means coupled to said output circuit and responsive to a predetermined value of the amplitude of auxiliary oscillations produced therein to actuate the first relay switch, and means coupled to said source and responsive to the presence of oscillations therein to actuate said second relay switch.

5. Apparatus for deriving from a source of high-frequency oscillations a relatively low-frequency wave whose frequency is equal to the difference between the frequency of said oscillations and a predetermined harmonic of said wave, said apparatus comprising a tuned amplifying system including an electron discharge tube having a cathode, a grid and an anode, a resonant input circuit tuned to the frequency of said wave, an output circuit connected to said anode and regeneratively coupled to said input circuit to sustain auxiliary oscillations having the frequency of said wave, means coupled to the output circuit of said system to derive therefrom a predetermined harmonic of said wave, a mixer coupled to said source and to said harmonic deriving means to mix said oscillations with said harmonic to produce a beat voltage whose frequency is equal to the difference therebetween, rectifying means coupled to said output circuit to produce a control bias proportional to the amplitude of said auxiliary oscillations, and means to apply said control bias to the grid of said tube to suppress the auxiliary oscillations in said system when said auxiliary oscillations attain a predetermined amplitude level.

HENDRIK NICOLAAS HANSEN.
JOHANNES A. GREEFKES.

REFERENCES CITED

The following references are of record in the file of this patent:

UNITED STATES PATENTS

| Number | Name | Date |
|---|---|---|
| 2,039,657 | Osborne | May 5, 1936 |
| 2,039,923 | O'Brien | May 5, 1936 |
| 2,124,191 | Geiger | July 19, 1938 |
| 2,344,678 | Crosby | Mar. 21, 1944 |
| 2,459,822 | Lalande | Jan. 25, 1949 |
| 2,460,800 | Batchelder | Feb. 8, 1949 |